United States Patent [19]
Chess

[11] Patent Number: 6,026,374
[45] Date of Patent: *Feb. 15, 2000

[54] SYSTEM AND METHOD FOR GENERATING TRUSTED DESCRIPTIONS OF INFORMATION PRODUCTS

[75] Inventor: David M. Chess, Mohegan Lake, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/655,138

[22] Filed: May 30, 1996

[51] Int. Cl.[7] .............................. G06F 15/21; H04L 9/30
[52] U.S. Cl. ................................ 705/26; 705/27; 705/39; 705/40
[58] Field of Search ................................. 705/26, 27, 39, 705/40

[56] References Cited

U.S. PATENT DOCUMENTS

| | | | |
|---|---|---|---|
| 4,799,156 | 1/1989 | Shavit et al. | 705/26 |
| 4,992,940 | 2/1991 | Dworkin | 705/26 |
| 5,267,171 | 11/1993 | Suzuki et al. | 364/479.04 |
| 5,553,145 | 9/1996 | Micali | 380/30 |
| 5,691,915 | 11/1997 | Funahashi et al. | 348/10 |

OTHER PUBLICATIONS

Amazon.com, "About Amazon.com", http://www.amazon.com/exec/obidos/subst/misc/company–info.html/002–8168496–5505654, p 1–2 & 1–3, Jul. 1998.

Simba Information, Inc., "Amazon.com Offers 1 Million Titles From 20,000 Publishers On Internet", BP Report, p 1, Oct. 1995.

Gray, Robert S., "Ph.D. Thesis Proposal: Transportable Agents", Dartmouth PCS–TR95–261, May 19, 1995, pp 1–47.

Franklin, Stan and Graesser, Art, "Is it an Agent, or Just a Program?: A Taxonomy for Autonomous Agents", Proceedings of the Third International Workshop on Agent Theories, Architectures, and Languages, Springer–Verlag, 1996, pp. 1–10, Jan. 1996.

Connolly, "Mobile Code", W3C, v 1.10, Dec. 9, 1996, pp 1–3.

Finin, Tim, "Mobile Agents", UMBC Agent Web, updated Dec. 17, 1998, pp. 1–4.

Chess, David, "Massively Distributed Systems", IBM Research, downloaded Feb. 1, 1999, pp. 1–2.

*Primary Examiner*—Allen R. MacDonald
*Assistant Examiner*—James W. Myhre
*Attorney, Agent, or Firm*—McGinn & Gibb, P.C.; David M. Shofi, Esq.

[57] ABSTRACT

A system and method using of a trusted third party to provide a description of an information product to potential buyers without disclosing the entire contents of the information products, which might compromise the interests of the seller. The buyer trusts the third party to give an accurate description of the information that is for sale, while the seller trusts the third party not to reveal an excessive amount of the information product's content. The system can include a seller of information products, a buyer of such products, and a trusted third party summarizer, each operating as a node in a communications network, such as the internet.

24 Claims, 3 Drawing Sheets

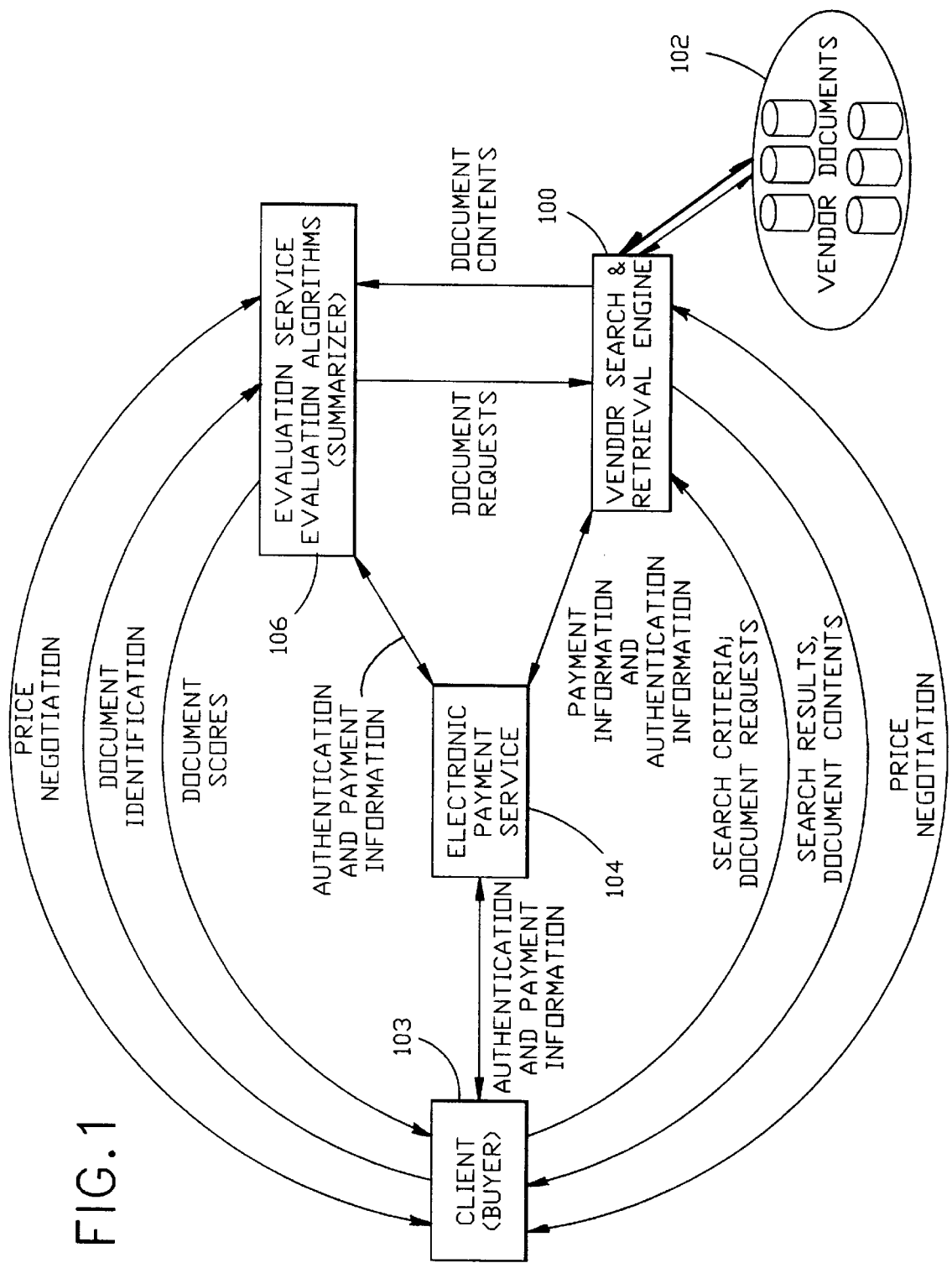

WELCOME TO THE OMNIDOC
DATA LIBRARY
ENTER SEARCH CRITERIA:
[_____]

[SUBMIT]  [CANCEL]

FIG.2a

DOCUMENTS MATCHING YOUR SEARCH

NAME    PRICE
_____   _____   [BUY]  [EVALUATE]
_____   _____   [BUY]  [EVALUATE]
_____   _____   [BUY]  [EVALUATE]

FIG.2b

AVAILABLE EVALUATION SERVICES
FOR DOCUMENTS SELECTED:

┌─────────────────┐
│ ACME            │
│ TRU-DATA        │
│ FRED's EVAL-U-WAIT │
└─────────────────┘

SELECT ONE, AND PRESS [GO]

FIG.2c

TRU-DATA EVALUATION SERVICE
YOUR SEARCH CRITERIA: [____]

DOCUMENT   COST OF EVALUATION
_____    _____    [EVALUATE]
_____    _____    [EVALUATE]

FIG.2d

CONFIRM PAYING $2.18
FOR: EVALUATION OF DOC.#320109

PASSWORD: [_____]   [CANCEL]

FIG.2e

EVALUATIONS

DOCUMENT    SCORE (0-100)
_____        12
_____        62
_____        72

FIG.2f

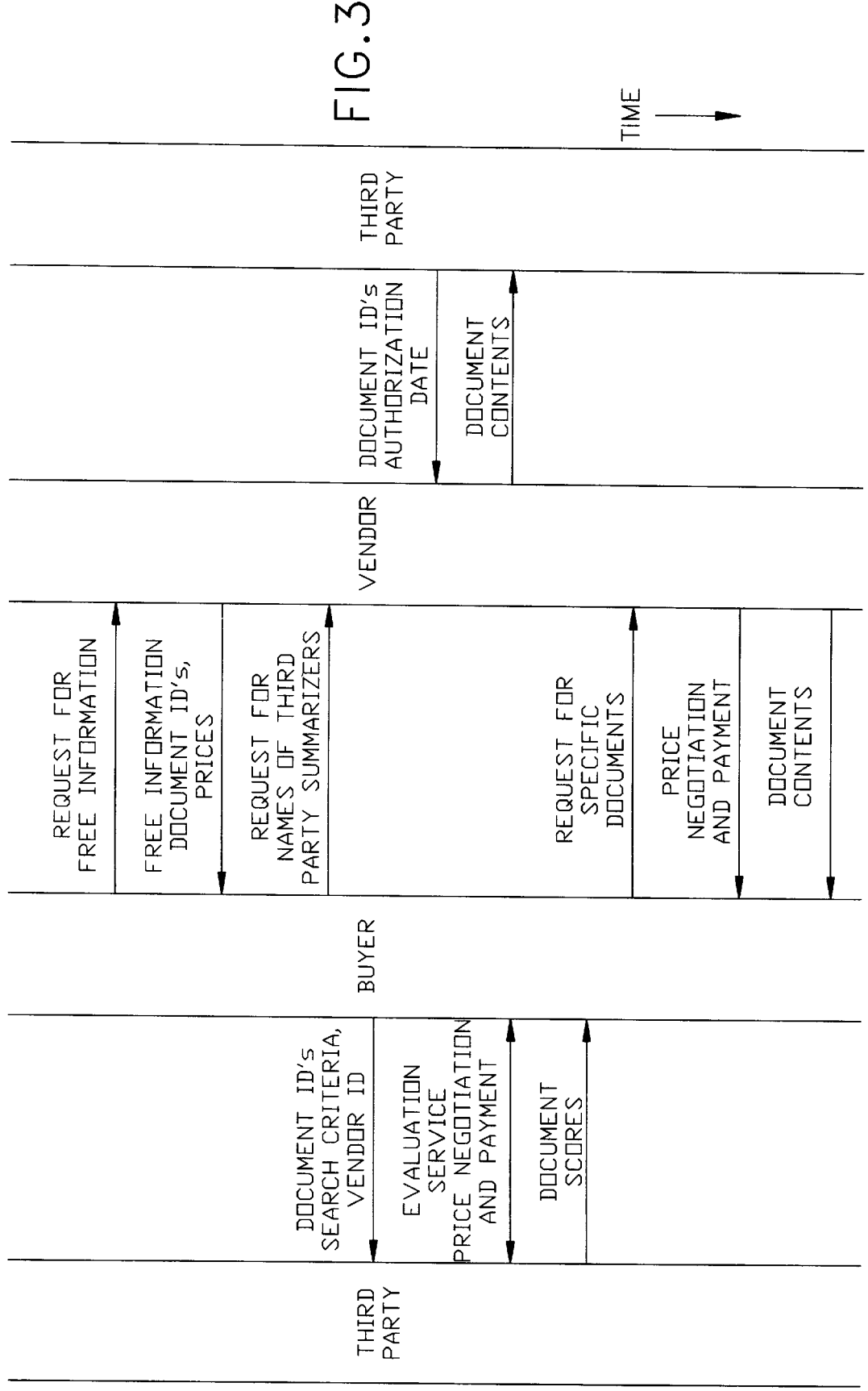

SYSTEM AND METHOD FOR GENERATING TRUSTED DESCRIPTIONS OF INFORMATION PRODUCTS

FIELD OF THE INVENTION

The invention relates to the distribution of information products in digital form.

BACKGROUND OF THE INVENTION

In an economy that supports the buying and selling of information, vendors need to be able to let their customers know what they have for sale, without giving away too much of the valuable information. Buyers need to be able to determine the characteristics of information they might want to purchase, without having to trust the claims of the sellers. For some purposes, informal or partial methods work: a magazine subscriber is willing to risk that future issues may be poorer in quality than past ones; a database provider may be willing to allow a potential customer a number of free trial searches; and so on. But for other applications, it is highly desirable for a potential buyer to be able to reliably determine various facts about a piece of information before buying it, and absolutely critical to the vendor that the buyer not be given actual read access to it.

SUMMARY OF THE INVENTION

The invention involves the use of a trusted third-party to provide a description of an information product to potential buyers without compromising the interests of the seller. The buyer trusts the third party to give an accurate description of the information that is for sale, while the seller trusts the third party not to reveal too much of the information's content. For brevity, we will refer to the third party in this system as the "summarizer", although it is not a necessity of this invention that what is produced is a summary in a strict sense.

For each piece of information covered by the system, the summarizer computes some function of the information's content. For the purposes of computing the value of the function, the summarizer has full access to the information. In one embodiment of the invention, the function computed by the summarizer is designed to indicate to some number of potential buyers how valuable the information is to them.

BRIEF DESCRIPTION OF THE DRAWINGS

FIG. 1 is a block diagram of a system in accordance with the invention.

FIGS. 2a–2f are examples of display screens of a system operating in accordance with the invention.

FIG. 3 is a flow diagram describing a method in accordance with the invention.

DETAILED DESCRIPTION OF THE INVENTION

The invention is a system and method for using a trusted third party, or "summarizer", to assess the usefulness of an information product. FIG. 1 is a block diagram of a system in accordance with the invention. FIG. 3 is a flow diagram showing the steps carried out by the system of FIG. 1, and will be discussed in conjunction with FIG. 1.

The system includes a vendor system 100, which can take the form of, for instance, a suitably programmed general purpose computing system, having access to a storage device 102 containing one or more information products that the vendor offers for sale. The vendor system can be accessible to the public by means of an Internet web site. The information products can include various publications, such as papers, books, journals, compiled reference works, government documents, etc. The vendor system 100 is connected to a client (buyer) system 103 via a communication system, such as the Internet. The client system, like the vendor system, can be a general purpose computing system programmed to carry out the functions described herein.

In accordance with the invention, the client system 103 will contact the vendor system 100 via the Internet. The buyer might locate this particular vendor by performing an Internet search (using any known search service) for vendors holding information products of the kind the buyer is looking for. When prompted, the buyer can submit a request for a listing of information products offered by the vendor that concern a particular topic. Employing data-transfer protocols (such as HTTP, FTP or WAIS) and search protocols and algorithms known to the art, the vendor displays a list of information products that may be of interest, along with the price that the vendor will charge for each. The products and their prices are displayed as a menu or form in the Web browser. The extent of information displayed about the product can be the product's title, a list of key terms or subjects discussed in the product, or an abstract of the product. Thus, the following exchange of information takes place between the vendor and buyer systems, as shown by the arrows connecting blocks 100 and 103 in FIG. 1:

From Buyer to Vendor: desired subject matter/search criteria;

From Vendor to Buyer: contents of the Vendor's free Web pages, search results, including product titles and prices.

If the prices are acceptable to the buyer, or the information product descriptions very convincing, the buyer may choose to purchase copies of one or more information products on the spot, using an electronic-payment system 104 and protocols known to the art (see, e.g., D. Chaum, "Online Cash Checks", Advances in Cryptology, EUROCRYPT '89, J. J. Quisquater & J. Vandewalle (Eds.), Springer-Verlag, pp. 288–93). In such case, the buyer will provide a payment authorization to the electronic payment service which will allow payment of the vendor for the information product purchased. The vendor's web site can, for instance, provide a convenient mechanism for completing the transaction, such as a link to the electronic payment service.

In accordance with the invention, the vendor system 100 will provide the buyer with the option to make use of a summarizer service, by means of pressing a different button on the form displayed on the Vendor's server. If the buyer elects to have the information product evaluated by the summarizer, he is presented with the names of trusted summarizer services that the vendor has previously contracted with. The buyer is presented with the option of choosing any one of the summarizers. When he chooses one, the name of the vendor and information identifying the information products to be evaluated are sent via the communications network to the summarizer service 106. The summarizer 106 can be a suitably programmed general purpose computer connected to the communications network. The buyer and the summarizer may now negotiate on price, and the buyer may provide to the summarizer a set of keywords representing the information he hopes will be found in the information products.

The data to be exchanged in this phase of the transaction is as follows:

From Buyer to Vendor: request for summarizer evaluation;

From Vendor to Buyer: names of contracted summarizers;
From Buyer to Summarizer: name of vendor, information identifying the information products to be evaluated;
Between Summarizer and Buyer: negotiation on price of the evaluation service;
From Buyer to Summarizer: Keywords.

The summarizer 106 then connects to the vendor system 100, and authenticates itself, to gain unrestricted access to the information products in question. Applying search and evaluation methods known to the art (for instance, a simple counting of the density of the buyer-supplied keywords and other words known to be correlated with them; or a more sophisticated system using knowledge of English grammar to analyze the semantic structure of each information product and use that knowledge in conjunction with a lexicon of related terms, and a neural network trained to recognize relevant connections to estimate the semantic distance between each information product and the buyer's keywords, etc.), and the summarizer computes a score for each information product, reflecting how likely it is to contain the information the buyer is looking for. This information is then relayed back to the buyer via the communications network, who is charged the agreed-upon price for the evaluation.

The data exchanged in this phase of the transaction:
From Summarizer to Vendor: names of information products to be evaluated, and data indicating the authenticity of the summarizer as an evaluator;
From Vendor to Summarizer: information product contents;
From Summarizer to Buyer: acknowledgement of request for services, request for payment information;
From Buyer to Summarizer: payment information;
From Summarizer to Buyer: information product scores;
From Summarizer to Electronic Payment System: payment information.

After reviewing the scores of the information products in question, the buyer then decides which ones to actually purchase from the vendor, and does so using a form designed for this purpose in the vendor's web site.

The data exchanged during this phase of the transaction:
From Buyer to Vendor: request for specific information products, payment information;
From Vendor to Buyer: information product contents;
From Vendor to Electronic Payment System: authorization for payment to vendor from the buyer's account.

It will be recognized by those skilled in the art that the above represents only one possible model. In other models, the evaluation service might be paid by the vendor rather than the buyer, the evaluation service might provide summaries of the information products rather than keyword-based scores, the vendor might obtain signed summaries or scores from the summarizer and provide them to the buyer along with advertising or search results, the summarizer's evaluation algorithms might be embodied in a program that both vendor and buyer can run, and so on.

FIGS. 2a–2f show examples of screens that might be displayed on the buyer's monitor when dealing with a vendor of information products in accordance with the invention.

In FIG. 2a, a welcome screen is displayed to the buyer, inviting the buyer to enter desired search terms. The buyer selects the "submit" key to send the search request to the vendor. The vendor can then perform a search of all information products for the search terms and return a result screen to the buyer, for example as shown in FIG. 2b.

As shown FIG. 2b, one of the options of the buyer is to have the information evaluated. In response to selecting the "evaluate" option, the buyer is presented with a list of summarizers, FIG. 2c, and is invited to select one.

Selection of one of the summarizers will cause a hyperlink to that summarizer, where the titles of the information products uncovered in the vendor's search will be displayed in a list, FIG. 2d, along with the price charged by the summarizer for evaluating each one. Also displayed is a field in which the buyer can enter key search terms to be used by the summarizer in conducting the evaluation. The buyer can then select individually the information products it wishes the summarizer to analyze.

A payment screen will then be displayed to the buyer, FIG. 2e, which will inform the user of the cost of the requested services, and request an authorization for payment.

After authorization of payment, the summarizer will analyze the selected information products and will return an evaluation summary screen, FIG. 2f, describing the results of the analysis. After reviewing these results, the buyer can return to the vendor's web site and order one or more of the evaluated information products, if desired.

Further examples:
It will be clear to those skilled in the art that the following examples are within the scope of the invention:

A service that runs a fixed function on information products being offered for sale, and makes available (and/or allows vendors to make available) the output of the function (perhaps digitally signed by the summarizer to prove authenticity);

A service wherein a potential buyer can submit some data to a summarizer (a personal profile, a list of key interests, and so on), and the summarizer will return a customized result based on that input, A summarizer which is made available as a program, or set of programs; vendors would advertise the results of running these programs on the information products they offer for sale, and buyers would be able to verify (after purchasing the items) that the advertising was correct, by running the summarizer program themselves;

A system in which a prospective buyer sends a summarization program to the vendor, and the vendor runs that program in a restricted environment, allowing the program to examine the information products for sale, but not to do anything else to the vendor's system, and strictly filtering (possibly to a single buy/don't-buy bit) the communication back from the program to the buyer.

While the invention has been described in particular with respect to preferred embodiments thereof, it will be recognized by those skilled in the art that modifications to the disclosed embodiments can be effected without departing from the spirit and scope of the invention.

I claim:
1. A system, comprising:
an information product vending system;
an information product buying system;
analyzing means, including a computer program, for analyzing one or more information products offered by the information product vending system, and for outputting a result indicative of the probable value of the product or products, the result being suitable for forwarding to the buying system without disclosing the entire contents of any of the information products; and
transmittal means, for sending part or all of the analyzing means, including said computer program, to the information product vending system, wherein said computer program is executed, and all or part of its output is returned to the product buying system, wherein said analyzing means provides a filtered communication link between said buying system and said computer program such, that said computer program returns information on whether or not the information products are worth buying and for preventing the information products from being transmitted to the buying system.

2. The system of claim 1, wherein the means for analyzing applies a mathematical function, expressed as a computer program, to each of the one or more information products, the function producing an output highly correlated with an information buyer's desires, as an input to the buying system.

3. The system of claim 2, wherein the analyzing program takes as an input data supplied by the buyer.

4. The system of claim 3, wherein the buyer has access to the analyzing program and can check the accuracy of any advertising claims made by a vendor operating the vending system.

5. The system of claim 2, wherein the transmittal means transmits the function to the product vending system from a system controlled by a trusted third party or "summarizer", at the request of the product buying system.

6. The system of claim 5, wherein the vending system, the buying system and the summarizer are connected via a communications network.

7. The system of claim 6, wherein the communications network comprise the Internet.

8. The system of claim 6, further comprising an electronic payment system coupled to the vending system, the buying system and the summarizer via the communications network, the electronic payment system including means for transferring a payment from the buyer to the vendor and from the buyer to the summarizer.

9. The system of claim 2, wherein the computer program transmitted to the product vending system is executed in a restricted environment, and wherein the communication of the output of the function back to the buying system is preformed in a controlled, secure manner.

10. The system of claim 9, wherein the output of the function comprises a single bit, representing the choices "buy" and "don't buy" with regard to the information product.

11. The system of claim 2, wherein the function computed by the analyzing program comprises a count of the number of occurrences in each of the one or more information products of keywords supplied by a buyer operating the buying system.

12. The system according to claim 1, wherein said analyzing means provides a potential buyer with an indication about a value of an information product without giving the buyer access to and possession of the information product itself.

13. A method for guiding a buyer's decision of whether to purchase an information product from an information product vendor, comprising:

sending from the buyer to the vendor a request for a list identifying information products relating to a particular topic;

identifying, by the vendor, one or more information products related to the particular topic;

sending to the vendor a computer program for analyzing one or more of the identified information products to determine their likely worth to the buyer; and providing the result of the analysis to the buyer prior to providing the contents of the identified information products to the buyer, in order to guide the buyer's decision of whether to buy any of the one or more of the identified information products, wherein said analyzing provides a filtered communication link between said buyer and said computer program such, that said computer program returns information on whether or not the information products are worth buying and for preventing the information products from being transmitted to the buyer.

14. The method of claim 13, wherein the analyzing comprises applying a mathematical or formal function, expressed as a computer program, to each of the one or more information products, the function producing an output highly correlated with the information buyer's desires, as input to the buyer.

15. The method of claim 14, wherein the analyzing program takes as an input data supplied by the buyer.

16. The method of claim 15, wherein the buyer has access to the analyzing program and can the accuracy of any advertising claims made by the vendor.

17. The method of claim 15, wherein the computer program sent to the vendor is executed in a restricted environment, and wherein the communication of the output of the computer program back to the buyer is performed in a controlled, secure manner.

18. The method of claim 17, wherein the output of the computer program comprises a single bit, representing the choices "buy" and "don't buy" with regard to the information product.

19. The method of claim 13, wherein the computer program is applied to the vendor from a trusted third party, or "summarizer", at the request of the buyer.

20. The method of claim 19, wherein the vendor, the buyer and the summarizer communicate with one another via a communications network.

21. The method of claim 20, wherein the communications network comprises the Internet.

22. The method of claim 20, authorizing, by the buyer, the payment of the vendor and the summarizer via an electronic payment system coupled to the communications network, the electronic payment system including means for transferring a payment from the buyer to the vendor and from the buyer to the summarizer.

23. The method of claim 14, wherein the function computed by the computer program comprises a count of the number of occurrences in each of the one or more information products of keywords supplied by a buyer operating the buyer.

24. The method according to claim 12, wherein said analyzing includes providing a potential buyer with an indication about a value of an information product without giving the buyer access to and possession of the information product itself.

* * * * *